July 16, 1935.  LA VERNE R. PHILPOTT  2,008,401
AIRPLANE POSITIONING SYSTEM
Filed April 19, 1932    3 Sheets-Sheet 1

WITNESSES:

INVENTOR
La Verne R. Philpott
BY
ATTORNEY

July 16, 1935.  LA VERNE R. PHILPOTT  2,008,401
AIRPLANE POSITIONING SYSTEM
Filed April 19, 1932  3 Sheets-Sheet 3

WITNESSES:
Leon J. Taza
F. M. Harris

INVENTOR
La Verne R. Philpott
BY F. W. Lyle
ATTORNEY

Patented July 16, 1935

2,008,401

UNITED STATES PATENT OFFICE 2,008,401

AIRPLANE POSITIONING SYSTEM

La Verne R. Philpott, Wilkinsburg, Pa., assignor to Westinghouse Electric & Manufacturing Company, a corporation of Pennsylvania Application April 19, 1932, Serial No. 606,147

9 Claims. (Cl. 250—11)

My invention relates to radio direction finding and positioning systems and particularly to a radio positioning system designed to aid airplane pilots in making "blind" landings.

Many schemes for aiding a pilot in making "blind" landings have been suggested but all of them have had some serious defect. Prior to my invention there was no positioning system that gave a pilot the position of his airplane regardless of the direction from which the airplane approached the landing field.

An object of my invention is to provide a system of the above-mentioned type which will give a pilot the position of his airplane at all points surrounding a landing field.

A further object of my invention is to provide a system of the above-mentioned type which will give a pilot the position of his airplane independently of the direction in which the airplane is flying.

A still further object of my invention is to provide a system of the above-mentioned type which requires only one carrier frequency.

In practicing my invention, I transmit two rotating directional radio fields from two points near the landing field, the two radio fields being rotated in the same direction and at the same speed. Another radio wave or field which is either non-directional or non-rotating or both and which is modulated at a low frequency bearing a fixed relation to the speed of rotation of said rotating fields is transmitted from some point near the landing field.

Two synchroscopes mounted on the airplane instrument panel and provided with intersecting pointers indicate the phase relationship between the low frequency modulated beam and each of the rotating beams. Since these phase relationships depend upon the position of the airplane, the point of intersection of the two synchroscope pointers indicates on a map the position of the airplane.

Other features and advantages of my invention will appear from the following description taken in connection with the accompanying drawings, in which Figure 1 is a diagram which illustrates the principle of operation of my invention.

Figure 1:
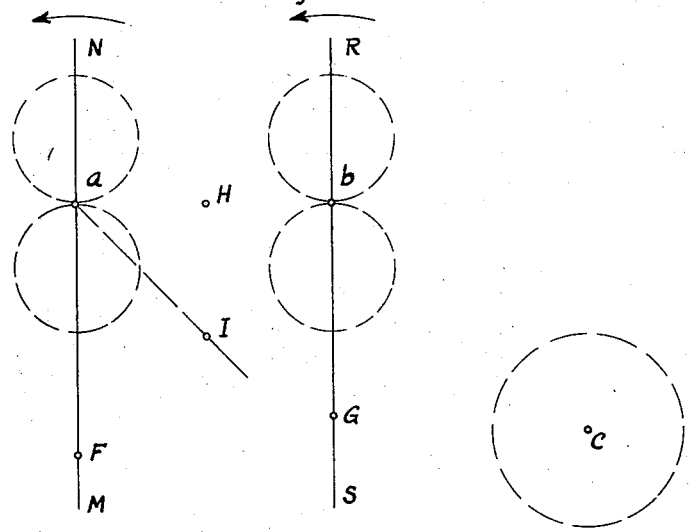

The theory of operation of my invention may be understood by referring to Fig. 1 of the drawings where the line M, N represents the plane of a loop antenna located at $a$, and where the dotted line indicates the characteristic figure-8 space pattern. The line S, R represents the plane of a loop antenna located at $b$, the dotted line indicating the figure -8 space pattern of this antenna. A non-directive antenna is located at $c$, its space pattern being indicated by the dotted circle.

When the loop antenna at $a$ is stationary and is excited with an unmodulated carrier wave, a radio receiver placed at F will receive signals of maximum intensity. If the radio receiver is moved to the point I, the signals will become weaker, while if the receiver is moved to the point H a signal of minimum intensity will be received.

If, instead of moving the receiver, it is held stationary at the point F and the loop antenna at $a$ is rotated, the signals at the receiver will alternately fade out and become strong. The cycle will be repeated twice for each rotation of the loop antenna, since the antenna, having a double space pattern, radiates a field of maximum strength in two directions. Thus, it will be seen that at the receiver, the carrier wave radiated from the rotating antenna is modulated at a frequency which is equal to twice the speed of rotation of the antenna. If the loop antenna rotates at 1800 R. P. M., a 60 cycle note will be heard at the receiver.

Now, if one receiver is placed at F and another receiver is placed at I, the 60 cycle note from the rotating antenna will be received at the two receivers out of phase. If the loop is being rotated counter-clockwise, the time phase of the 60 cycle tone received at the point I will lag 90 electrical degrees behind that of the tone received at the point F.

If now the non-directive transmitter located at the point $c$, radiates a carrier wave modulated at 60 cycles, this 60 cycle tone will be received at the points F and I with the same time phase. We now have a system in which a receiver receives a 60 cycle tone from the transmitter at $c$, the phase of which is independent of the position of the receiver, while at the same time, it receives a 60 cycle tone from the transmitter at $a$, the phase of which depends upon the location of the receiver. Consequently, it is possible to determine the direction of the receiver from the point $a$ by measuring the phase angle between the 60 cycle tones received from the transmitter at C and the transmitter at A. For example, the system may be so adjusted that with the receiver at F the 60 cycle tones from $a$ and $c$ reach the receiver in the same time phase. In that case, if the receiver is moved to a point where the synchroscope shows a leading phase difference of 90°, it is apparent that the receiver is on the line drawn through $a$, I.

In the manner described above, the rotating loop at $b$ makes it possible to determine the direction of a receiver from the point $b$. Knowing the direction of the receiver from two known points, the position of the receiver may be determined.

Figure 2:
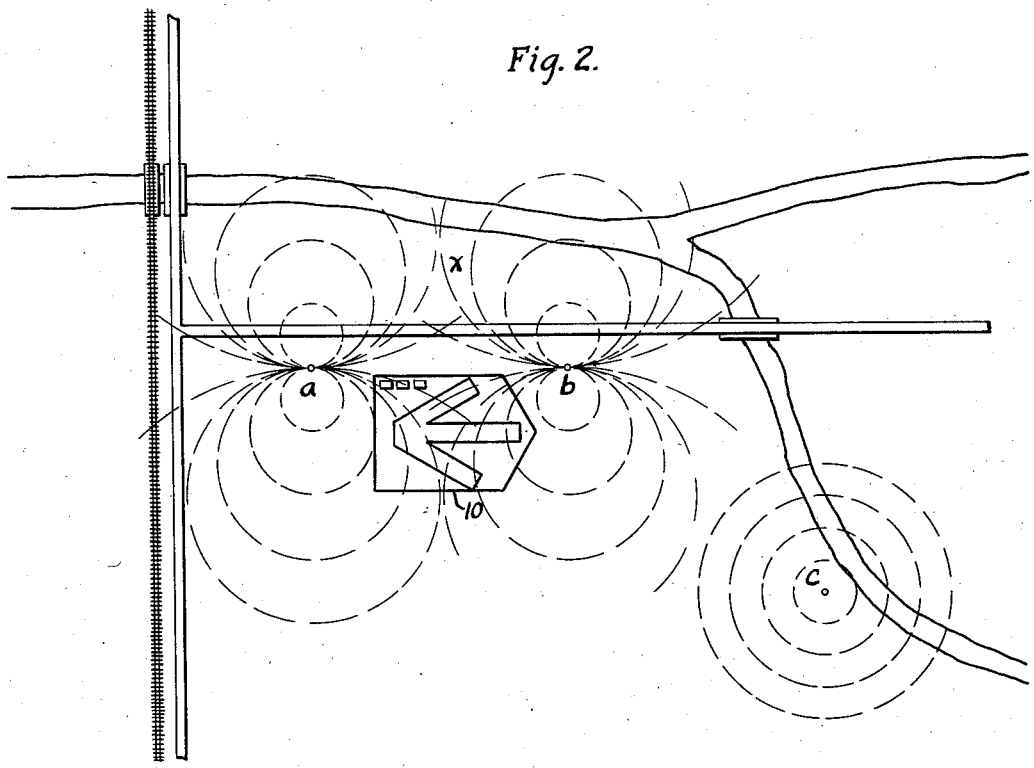
Fig. 2 is a diagram showing the location of my transmitter stations with respect to an airplane landing field.

Fig. 2 illustrates how the transmitting apparatus may be located with respect to an airplane landing field 10. The transmitters at $a$ and $b$ are preferably so located with respect to the landing field that a line drawn between these two points does not cross the field. If desired, the non-directive transmitter which is shown located at $c$ may be located at either $a$ or $b$.

Figure 3:
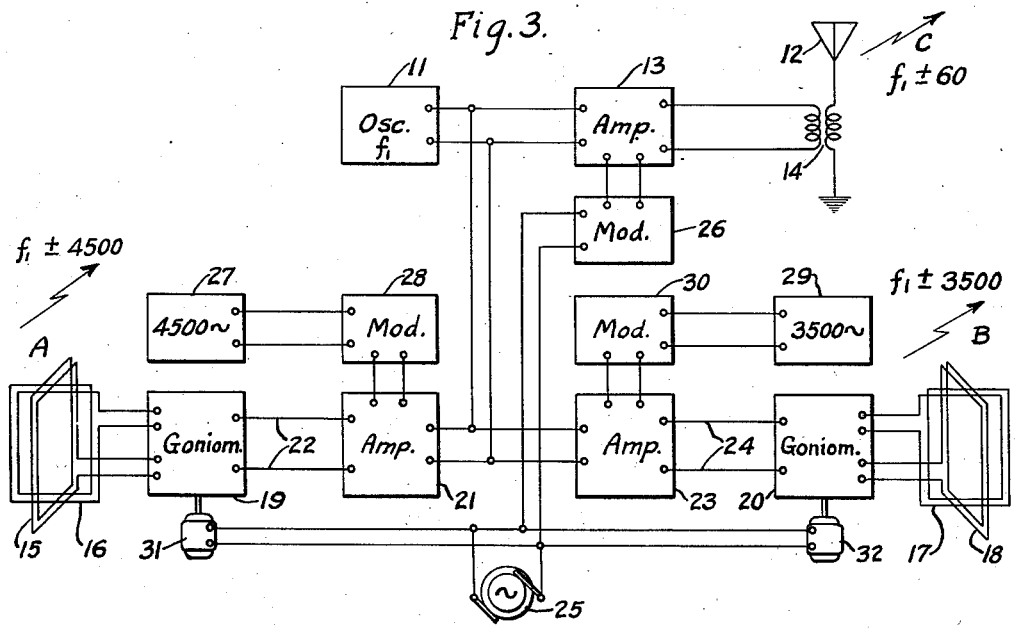
Fig. 3 is a schematic diagram of the transmitting system shown in Fig. 2.

The transmitting system, which includes the transmitters A, B and C, is shown in Fig. 3. The transmitters A, B and C have their antennæ located at the points $a$, $b$, and $c$ respectively, shown in Figs. 1 and 2. The carrier wave for all three transmitters is supplied from a single oscillator.

At $c$ the non-directive antenna 12 is coupled to a power amplifier 13 through a transformer 14, the input of this power amplifier being connected to the oscillator 11.

Instead of a simple rotating loop at stations A and B, goniometer apparatus which gives the same results electrically is employed in order to obtain a more satisfactory mechanical structure. At the points $a$ and $b$, two loops, 15, 16 and 17, 18, respectively, crossed at an angle of 90°, are located. These loops are fed by goniometers 19 and 20 which will be explained in detail hereinafter.

The carrier wave energy for the transmitter A is fed from the oscillator 11 to the power amplifier 21 and through the conductors 22 to the rotor of the goniometer 19.

The carrier wave energy for the transmitter B is supplied from the oscillator 11 through the power amplifier 23 and conductors 24 to the rotor of the goniometer 20.

The output of transmitter C is modulated by the 60 cycle output of a generator 25 which is connected to the input of a modulator 26 having its output circuit coupled to the power amplifier 13.

The output of transmitter A is modulated by a 4500 cycle source 27 which is coupled to the power amplifier 21 through a modulator 28.

The output of the transmitter B is modulated by a 3500 cycle source 29 which is coupled to the power amplifier 23 through a modulator 30.

The rotors of the goniometers 19 and 20 are driven by synchronous motors 31 and 32, respectively, connected to the 60 cycle source 25, the speed of the motors being such as to rotate the directive radio fields to give a 60 cycle modulation at a receiver.

Figure 4:
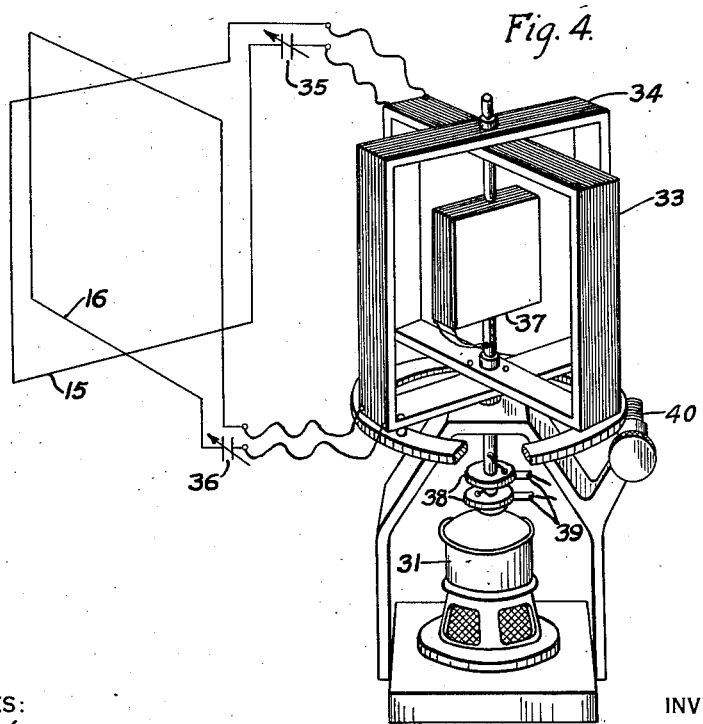
Fig. 4 is a view of one of the goniometers indicated schematically in Fig. 3.

The details of the goniometer structure at station A are shown in Fig. 4. The radiating loops 15, 16 are connected to the goniometer stator windings 33 and 34 through variable condensers 35 and 36 which are used for tuning the loops to the transmitting frequency. A rotor coil 37 positioned within the stator coils 33 and 34 is rotatably mounted and coupled to the synchronous motor 31. The leads of the coil 37 are connected to slip rings 38 so that the rotor coil may be supplied with current through the brushes 39.

In order to make phase adjustments possible for purposes which will be specified later, the stator coils 33 and 34 are movably mounted so that they may be rotated by means of a worm gear 40.

Figure 5:
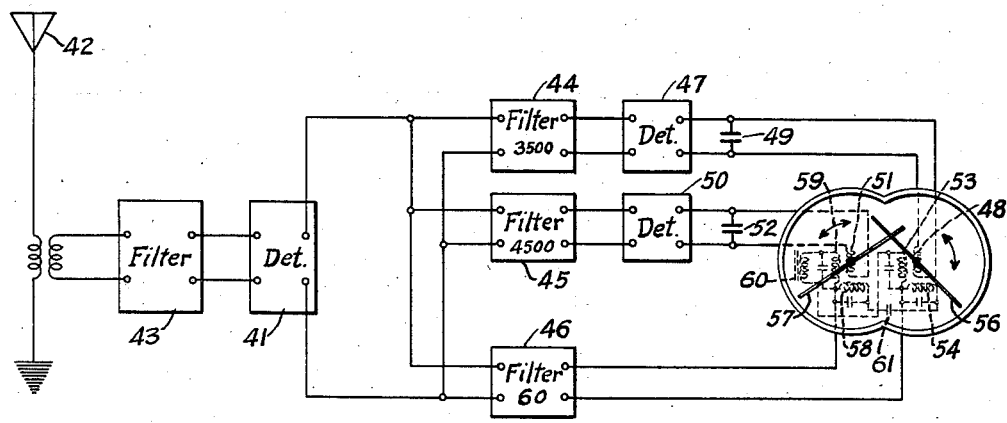
Fig. 5 is a schematic diagram of the receiving apparatus and synchroscope unit located in the airplane.

The receiving system which will be located on the airplane is shown in Fig. 5. It comprises a detector 41 which is coupled to the receiving antenna 42 through a filter 43 for tuning the receiver to the carrier wave of the transmitter. Three filters 44, 45 and 46, which have their inputs connected in parallel, are connected to the output of the detector 41.

The output of the 3500 cycle filter 44 feeds into a detector 47, the output of which is connected to the rotor coil 48 of a synchroscope having a pointer 56. The coil 48 is tuned to resonance at 60 cycles by means of a condenser 49 shunted thereacross. The output of the 4500 cycle filter 45 feeds into a detector 50, the output of which is connected to the rotor coil 51 of a second synchroscope having a pointer 57. Coil 51 is also tuned to resonance at 60 cycles by means of a condenser 52 shunted thereacross. The output of the 60 cycle filter 46 feeds into the stator coils 53, 54 and 58, 59 the two synchroscopes, each one of these coils being tuned to resonance at 60 cycles by means of a shunting condenser. As indicated on the drawings, coils 51, 58 and 59 rotate the pointer 57 of one synchroscope while coils 48, 53 and 54 rotate the pointer 56 of the other synchroscope.

The stator coils of one synchroscope are connected in series with the stator coils of the other synchroscope so that the standard frequency from the station C is applied to the stators of both synchroscopes. The phase of the stator current is split in the usual way by means of inductor 60 and condenser 61.

Figure 6:
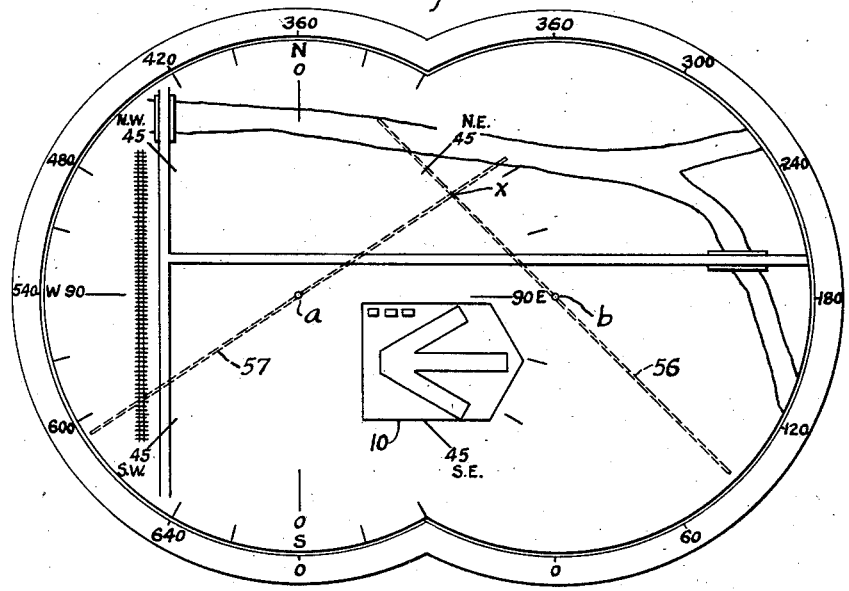
Fig. 6 is a view of the face of the synchroscope unit having thereon a map of the territory shown in Fig. 2.

Fig. 6 shows the face of the synchroscope unit with a transparent map of the landing field superimposed thereon. The points $a$ and $b$, the landing field 10, and the country immediately surrounding the land field shown on this may. The map is so placed over the face of the synchroscope that the points $a$ and $b$ (corresponding to the locations of the radiating lops of transmitters A and B) are directly over the pivot points of the pointers 57 and 56, respectively.

Figure 7:
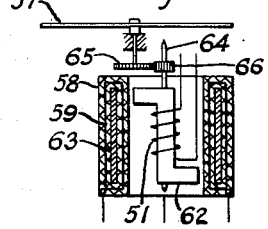
Fig. 7 is a view, partly in cross-section, of one of the synchroscopes employed in my synchroscope unit.

The structure of the synchroscopes is shown in Fig. 7. The synchroscope is of a conventional design, comprising a pivoted iron armature 62 having a rotor winding 51 thereon. The stator windings 58 and 59 are torroidal coils wound on an iron core 63. They are connected as indicated in Fig. 5 to provide two magnetic fields spaced 90 degrees apart.

The pointer 57 is connected to the armature shaft 64 through gears 65 and 66 having a two to one ratio so that the pointer rotates once during two rotations of the armature. This gear ratio is required because of the double pattern of the loop.

In operating the receiver, the selector filter 43 is tuned to the carrier frequency of the transmitters A, B and C. In the output of the detector 41, there will appear the 60 cycle modulation of the transmitter C, the 4500 cycle modulation of the transmitter A and the 3500 cycle modulation of the transmitter B. These frequencies are separated by the filters 44, 45 and 46, the 60 cycle current being impressed directly upon the stator coils of the two synchroscopes. The 3500 cycle current and the 4500 cycle current carry the 60 cycle modulation frequency determined by the rotation of the two loops. These 60 cycle modulations appear in the outputs of the second detectors 47 and 50 and are impressed upon the rotor coils 48 and 51 of the two synchroscopes.

From the above description it will be apparent that the 60 cycle frequency of transmitter A is impressed upon synchroscope coil 51, that the 60 cycle frequency of transmitter B is impressed upon synchroscope coil 48, and that the 60 cycle frequency of transmitter C is impressed upon stator coils 53, 54 and 58, 59 of the two synchroscopes. By means of this system, only one carrier wave is necessary to supply three separate 60 cycle currents to the synchroscopes.

Referring to Fig. 6, it will be evident that when the two pointers swing so that they are coincident, the position of the airplane cannot be determined. For this reason, the transmitter stations A and B are so positioned with respect to the landing field that the needles are never coincident over the landing field where it is essential that the pilot know his position.

The location of the transmitting stations with respect to the landing field is as uniform as conditions permit at all landing fields. We may assume that the standard layout at a landing field is with the radiating loops positioned on an east-west line.

The position of the map of the landing field on the synchroscope is, as explained above, with the loop positions a and b over the pointer pivots. That is, a line drawn between the pivots will point east and west on the map. Each synchroscope is so adjusted that when the currents fed to a synchroscope have a phase difference of 180° or 540°, the pointer of that synchroscope points toward the pivot point of the other synchroscope, that is, the synchroscope pointers point east and west on the map in this instance.

To make the initial adjustment of the apparatus at the landing field, the receiver may be placed between the two radiating loops located at a and b and the phase relation between the 60 cycle tone from the transmitter a and the 60 cycle tone from the transmitter c is adjusted at A. This phase adjustment is made by rotating the stator of the goniometer at station A by means of worm gear 40 until the two 60 cycle tones reach the receiver in 180° time phase. This adjustment has been completed when the pointer 61 reads 180° (the other end of the pointer reading 540°). When so adjusted, the pointer 51 is pointing east and west on the map. It is also pointing to the location of the receiving apparatus, this being the real object of the adjustment. A similar adjustment is made in the phase-relation of the 60 cycle tones transmitted from stations B and C at station B so that the pointer 56 will likewise be made to point toward the receiving apparatus.

After the above-described adjustments have been made, if an airplane carrying the receiving apparatus is located at the point X (Fig. 2), both synchroscope pointers will point toward X on the map and their point of intersection will give the location of the airplane.

If the conditions at a landing field are such that the transmitter layout must be with the radiating loops on the line other than the east-west line, an adjustment of the apparatus similar to that described above is still satisfactory. A case will be assumed where transmitter B is north of the east-west line, running through station A, the angle made by this east-west line and a line drawn between the two radiating loops being 30°.

The map of this landing field will be positioned on the synchroscope as usual with the points on the map corresponding to the locations of the radiating loops of transmitters A and B superimposed on the pivot points of the pointers 56 and 57. The east-west line of the map now makes an angle of 30° with the line drawn between the pivot points.

The adjustment of the phase relation of the 60 cycle tones at this landing field are made in the same way as described above for the landing field having a standard layout. In other words, the adjustment is made by placing the receiver on a line between the radiating loops of transmitters A and B and by so adjusting the stator of each goniometer that both synchroscopes read 180° (The other end of each pointer reading 540°).

The adjustment of the apparatus has been described in some detail in order to explain more clearly the theory of operation of the apparatus. In most cases the easiest way to adjust the apparatus is to take the receiving apparatus to a known point in the vicinity of the transmitters, say one corner of the landing field, and then adjust the goniometer stator of each rotating beam transmitter until its corresponding synchroscope pointer points to said known point on the map.

It will be understood that when it is stated that the receiving apparatus is placed in a certain position it is meant that actually, the receiving antenna is placed in this position. However, for all practical purposes, in the present application of the invention, the receiving antenna and the rest of the receiving apparatus are in the same position.

It will be understood that the pointers 56 and 57 are made double-ended because the double pattern of the loop and the two-to-one gearing in the synchroscope make it possible for either end of a pointer to point towards the position of the airplane. While this makes possible an error of 180° with a single synchroscope, such an error is impossible when a second synchroscope is used except when the two pointers are coincident.

If the two rotating loops are not the same distance apart at all landing fields, the scale of the map must be altered in such a manner that the distance between the points on the map corresponding to the locations of the radiating loops is the same for all landing fields.

If one rotating beam transmitter at a landing field is of low-power and the other two transmitters at the field are of high power, the high power transmitters will give a pilot the direction of the field when the plane is at a distant point while the three transmitters together will give the pilot the position of his plane when close to the field.

It will be understood that the map placed over the synchroscope does not include any territory that is at a distance from the landing field. For this reason, the edge of the map is marked in geographical degrees in the same way compass cards are marked so that the pilot can determine his direction from the landing field. At a distance, of course, the only synchroscope which is operating is the one receiving energy from the high power rotating beacon and the compass marks are placed on the map to cooperate with this synchroscope pointer.

The degrees marked on the edge of the synchroscope are electrical degrees. If the rotating beacon stations are not on the same geographical line at two landing fields, the geographical degrees on the map will be shifted with respect to the electrical degree markings when the map of one of said landing fields is replaced by the map of the others.

My invention may be extended to nationwide proportions by separating the radiating loops to a distance of 200 miles approximately. Here a different radio channel must be employed for each loop, and a universal standard frequency sent out to be used as a standard of frequency and phase for radiating loops throughout the nation. At each high power loop there can be a secondary loop of low power which may be used in local positioning while landing.

Various other modifications may be made in my invention without departing from the spirit and scope thereof and I desire therefore that only such limitations shall be placed thereon as are imposed by the prior art and are set forth in the appended claims.

I claim as my invention:

1. A radio positioning system comprising a plurality of directive transmitters, means for synchronously rotating the fields radiated from said transmitters, a transmitter which radiates a non-rotating field, and means for modulating said non-rotating field at a frequency bearing a fixed relation to the frequency of rotation of said fields, means for imparting distinguishing characteristics to the energy radiated from the various transmitters, said transmitters being so located that energy from all the transmitters may be received within a given area.

2. A radio positioning system comprising a pluraltiy of directive transmitters each of which radiates a field of energy in a figure-8 pattern, means for synchronously rotating said fields of energy, a transmitter which radiates a non-rotating field, and means for modulating said non-rotating field at a frequency which is double the frequency of rotation of said figure-8 fields, means for imparting distinguishing characteristics to the energy radiated from the various transmitters, said transmitters being so located that energy from all the transmitters may be received within a given area.

3. A radio positioning system comprising a plurality of radio transmitters having directional characteristics, one of said transmitters having its output circuit connected to a rotatable coil, another of said transmitters having its output circuit connected to a second rotatable coil, means for rotating said coils synchronously whereby rotating directive radio fields are radiated, said rotating fields covering a common territory, means for radiating a radio field of uniform intensity which covers said territory, means for modulating said last named radio field at a frequency having a fixed relation to the frequency of rotation of said rotating fields, and means for imparting distinguishing characteristics to the energy radiated from the various transmitters.

4. A radio positioning system comprising a plurality of radio-transmitters and means for holding said transmitters on a common carrier frequency, one of said transmitters radiating a field having uniform intensity in a given territory, a source of low frequency energy, means for modulating said field of uniform intensity by said low frequency energy, another of said transmitters radiating a directional field which is supplied from a rotatable loop and which covers said given territory, means including a synchronous motor connected to said source of low frequency energy for rotating said loop, and means for modulating the output of said last transmitter by energy having a frequency higher than the frequency of rotation of said loop.

5. A radio positioning system comprising a plurality of radio-transmitters and means for holding said transmitters on a common carrier frequency, one of said transmitters radiating a field having uniform intensity in a given territory, a source of low frequency energy, means for modulating said field of uniform intensity by said low frequency energy, another of said transmitters radiating a directional field which is supplied from a rotatable loop, and which covers said given territory, means including a synchronous motor connected to said source of low frequency energy for rotating said loop, and means for modulating the output of said last transmitter by energy having a frequency higher than the frequency of rotation of said loop.

6. In combination, a plurality of radio transmitters and means for holding said transmitters on a common carrier frequency, one of said transmitters radiating a non-rotating field, a source of low frequency energy, means for modulating said non-rotating field by said low frequency energy, another of said transmitters radiating a directional field which is supplied from a rotatable loop and which extends over at least a portion of the territory covered by said non-rotating field, means including a synchronous motor connected to said source of low-frequency energy for rotating said loop whereby said directional field is rotated, means for modulating the output of said last transmitter by energy having an intermediate frequency which is higher than the frequency of rotation of said loop, and receiving apparatus for indicating the phase relation between said rotation field and the low frequency modulation of said non-rotating field, said apparatus comprising means for selecting and detecting said carrier frequency, means for selecting and detecting the resulting intermediate frequency, a synchroscope, and means impressing the two low frequency currents resulting from said detections upon said synchroscope.

7. In combination, means for transmitting a rotating directional radio wave, means for transmitting a second rotating directional radio wave, means for transmitting a non-rotating radio wave modulated by a low frequency, said low frequency bearing a fixed relationship to the speed of rotation of said rotating waves, means for imparting distinguishing characteristics to the energy radiated from the various transmitting means, said first two transmitting means being spaced apart and being located in the vicinity of the area within which an observer is to locate his position, and receiving apparatus comprising means for indicating the phase relationship between said first rotating wave and said low-frequency modulation, and a second means for indicating the phase relationship between said second rotating wave and said low frequency modulation.

8. In combination, means for transmitting a rotating directional radio wave over a given area, means for transmitting a second rotating directional radio wave over said area, means for transmitting a non-rotating radio wave modulated by a low frequency over said area, said low frequency being equal to the frequency of the maximum energy impulses received at a fixed point from one of said rotating waves, means for imparting distinguishing characteristics to the energy radiated from the various transmitting means, said first two transmitting means being spaced apart, and radio receiving apparatus comprising means for indicating the phase relationship between said first rotating wave and said low frequency modulation, and a second means for indicating the phase relationship between said second rotating wave and said low frequency modulation, said last two means actuating rotatable line defining elements which intersect over a given area.

9. In combination, means for transmitting a rotating directional radio wave over a given area, means for transmitting a second rotating directional radio wave over said area, means for transmitting a non-rotating radio wave modulated by a low frequency over said area, said low frequency being equal to the frequency of the maximum energy impulses received at a fixed point from one of said rotating waves, means for imparting distinguishing characteristics to the energy radiated from the various transmitting means, said first two transmitting means being spaced apart, and a receiving instrument having a map of said area visible on the face thereof, said instrument including a synchroscope which actuates a line defining element pivotally mounted at a point on said map corresponding to the location of one of said rotating beam transmitters in said area and a second synchroscope which actuates a line defining element pivotally mounted at a point on said map corresponding to the location of said other rotating beam transmitter in said area, and means for making each synchroscope indicate the phase relationship between said low frequency modulation and the rotating beam transmitted from the station corresponding to the pivot point of the synchroscope line defining element.

LA VERNE R. PHILPOTT.